Feb. 25, 1930.                P. SALVAT                 1,748,366
                         WOOD WORKING MACHINE
                          Filed June 21, 1929
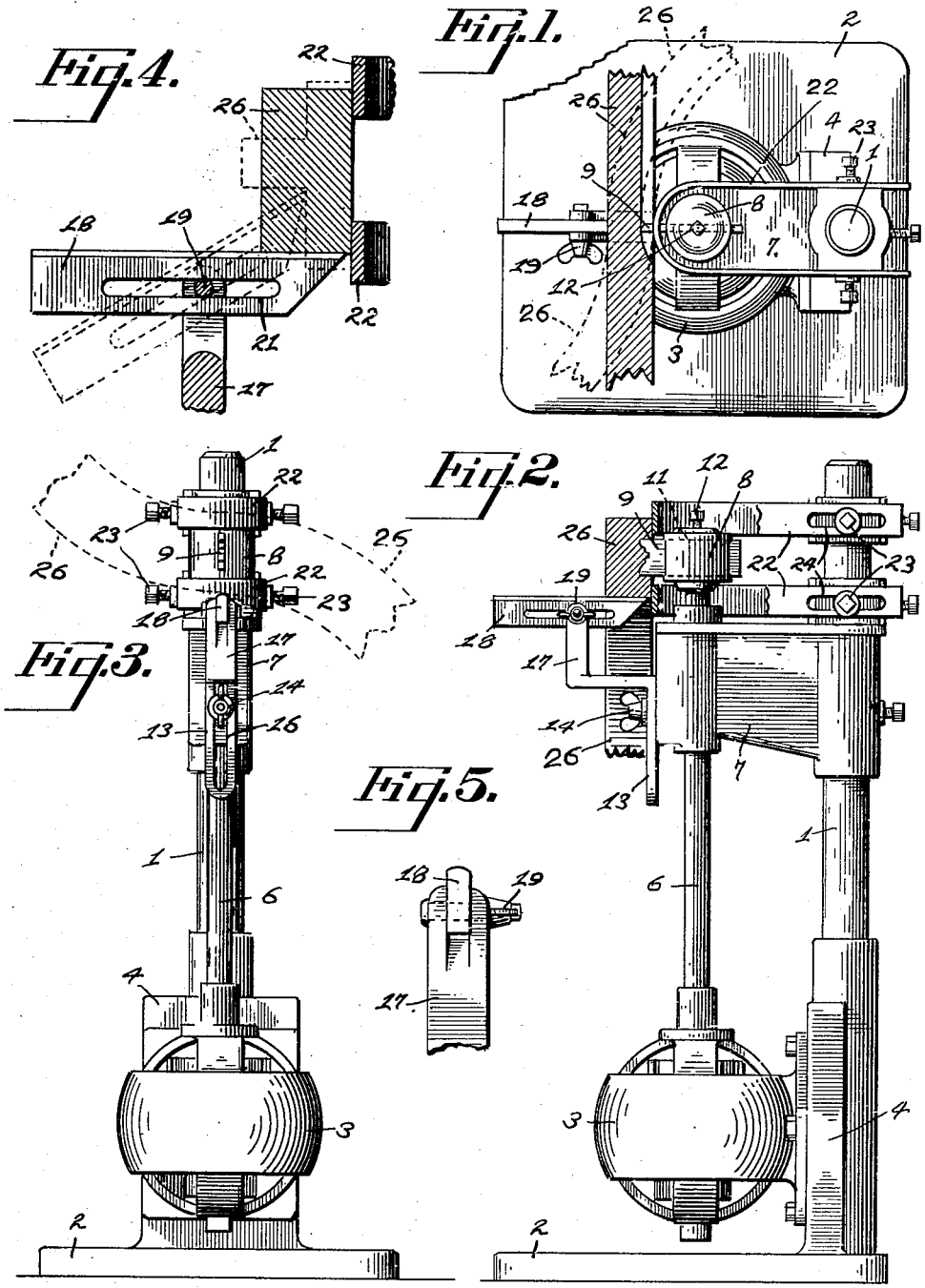
INVENTOR.
PIERRE SALVAT
BY
HIS ATTORNEY.

Patented Feb. 25, 1930

1,748,366

UNITED STATES PATENT OFFICE

PIERRE SALVAT, OF SAN FRANCISCO, CALIFORNIA

WOODWORKING MACHINE

Application filed June 21, 1929. Serial No. 372,654.

My invention relates to improvements in woodworking and shaping machines wherein a motor mounted adjacent the base of a supporting pillar is provided with a vertically disposed shaft extending upwardly through a bearing bracket mounted upon the upper portion of the pillar and provided with adjustable guide means to guide and support material presented to a cutter mounted directly upon the upper end of the shaft and actuated directly by the motor.

The primary object of my invention is to provide an improved wood working and shaping machine of the character described.

Another object is to provide an improved machine wherein a cutting member is adjustably held by a chuck secured directly to the shaft of a motor to apply power directly to the cutter.

Another object is to provide an improved machine having improved guide means adjustable relative to a cutter to guide and support material in any desired relation to the cutter to facilitate the manipulation of said material past the cutter.

A further object is to provide an improved guide adapted to be adjusted transversely relative to the axis of the cutter and also to be adjusted pivotally and longitudinally within a vertical plane passing through the axis of the cutter whereby material may be held in angular relation to the cutter.

A still further object is to provide an improved machine of simple and extremely compact construction which can be manufactured and operated easily and efficiently, and which may be readily shifted to a convenient location for use.

The invention consists in the specific details of construction and arrangement disclosed in the drawings forming a part of the present application wherein like characters of reference are used to designate similar parts throughout the drawings and specification and in which—

Fig. 1 is a broken plan view of my improved wood working machine, disclosing the manner in which material is presented to the cutter for shaping;

Fig. 2 is a side elevation of the machine, the guards being broken away and shown in section;

Fig. 3 is a front elevation of the machine;

Fig. 4 is a broken detail of the guide drawn upon a somewhat larger scale and disclosing the manner in which said guide may be adjusted; and Fig. 5 is an end view of the guide as shown in Fig. 4.

Referring to the drawings, the numeral 1 is used to designate in general a supporting pillar extending vertically upward from a base 2. A motor 3 is secured upon an enlarged mounting plate 4 formed upon the pillar 1 adjacent the base 2. The motor 3 is provided with a shaft 6 extending vertically upward from the motor 3 through a bearing bracket 7 slidably secured upon the upper portion of the pillar 1.

A chuck 8 is mounted directly upon the upper end of the motor shaft 4. A suitable cutter blade 9 is adjustably and detachably secured upon the chuck 8, said blade being mounted within a slot 11 formed in a vertical plane through the chuck 8 and extending through the axis of the chuck. A securing screw 12 is tapped axially into the end of the chuck to engage and clamp the cutter blade 9 in a desired position.

A guide bracket 13 is slidably mounted upon the outer end of the bearing bracket 7, said guide bracket 13 being adjustably secured by means of a suitable securing member 14 extending through a slot 16 formed in the body of said guide bracket to permit vertical adjustment thereof. The bracket 13 is provided with an offset arm portion 17 extending upwardly into spaced relation to the cutter blade 9. The extreme end of the arm 17 is bifurcated to receive a guide member 18 adjustably secured thereon by a suitable securing member 19 extending through a slot 21 longitudinally disposed within the body of the guide member 18. The guide 18 is supported within a vertical plane passing through the axis of the shaft 6, said guide being slidably adjustable transversely to the axis of the cutter, and also pivotally adjustable within said vertical plane.

A pair of guards 22 are slidably mounted upon the upper end of the pillar 1 by means of securing members 23 engaging slots 24 formed in the guards and permitting horizontal and vertical adjustment thereof relative to the pillar 1. The guards 22 are formed in a U-shape with the closed end extending around the chuck 8 and being adjustable to a desired relation to the cutter blade 9. The guards permit only the outer end of the cutter to be exposed and prevent material or workmen from coming into inadvertent contact with the rotating chuck and cutter. At the same time, the guards form a backing or depth gage against which material may be held to obtain a desired depth of cut by the cutter.

In operation, the machine is constructed and assembled as above described, the machine being entirely self-contained, compact and readily movable to any desired location within a shop whereby the machine may be shifted and operated independently of power connections other than the motor 3 which is connected in the ordinary manner to a source of electrical energy. A cutter blade 9 having a cutter face of desired form is secured within the chuck 8 and the blade 9 and guards 22 adjusted to cause the cutting face to extend outwardly a desired distance to produce a desired form and depth of cut. The guide member 18 is adjusted to form a support upon which material to be shaped may be supported in a desired relation to the cutter 9 while said material is moved manually past the cutter.

A piece of material 26 to be shaped is rested upon the guide 18 and pressed inwardly against the cutter 9 and then moved longitudinally past the cutter, the position of the cut relative to the face of the material 26 being regulated by a proper adjustment of the guide 18, while the depth of cut is regulated by the relative adjustment of the guards 22 and blade 9. As the material is moved past the blade, the cutter operates to make a cut of the desired form and depth in the material. The guide 18 supports the material with its lower edge a fixed distance from the plane of cut, thereby permitting irregular pieces of material such as indicated in dotted lines in Figs. 1 and 3 to be moved past the cutter. A pivotal adjustment of the guide 18, as indicated in dotted lines in Fig. 4 permits the material 26 to be engaged and supported at a required angle, or to engage an offset portion of the material as indicated in dotted lines in said figure.

Having thus described my invention, what I claim as new and desire to secure by Letters Patent is—

1. A wood working machine comprising a vertically disposed pillar; a motor mounted upon the base of the pillar; a bearing bracket mounted upon the upper portion of the pillar; a vertically disposed shaft connected at its lower end to the rotor of the motor and extending upwardly through the bearing bracket; a chuck mounted upon the upper end of the shaft; a cutter adjustably mounted upon the chuck; and a guide mounted adjacent the cutter to guide and support material presented to the cutter.

2. A wood working machine comprising a vertically disposed pillar; a motor mounted upon the base of the pillar; a bearing bracket mounted upon the upper portion of the pillar; a vertically disposed shaft connected at its lower end to the rotor of the motor and extending upwardly through the bearing bracket; a chuck mounted upon the upper end of the shaft; a cutter adjustably mounted upon the chuck; and a guide adjustably mounted adjacent the cutter to guide and support material presented to the cutter in a desired relation.

3. A wood working machine comprising a vertically disposed pillar; a motor mounted adjacent the base of the pillar; a bearing bracket mounted upon the upper portion of the pillar; a vertically disposed shaft connected at its lower end to the rotor of the motor and extending upwardly through the bearing bracket; a chuck mounted upon the upper end of the shaft; a cutter adjustably mounted upon the chuck; a guide bracket mounted upon the bearing bracket; and a guide adjustably mounted upon the guide bracket and movable to a desired relation to the cutter to guide and support material presented thereto for shaping.

4. A wood working machine comprising a vertically disposed pillar; a motor mounted adjacent the base of the pillar; a bearing bracket mounted upon the upper portion of the pillar; a vertically disposed shaft connected at its lower end to the rotor of the motor and extending upwardly through the bearing bracket; a chuck mounted upon the upper end of the shaft; a cutter adjustably mounted upon the chuck; a guide bracket adjustably mounted upon the bearing bracket; and a guide adjustably mounted upon the guide bracket and movable to desired relation to the cutter to guide and support material presented thereto for shaping.

5. A wood working machine comprising a vertically disposed pillar; a motor mounted adjacent the base of the pillar; a bearing bracket mounted upon the upper portion of the pillar; a vertically disposed shaft connected at its lower end to the rotor of the motor and extending upwardly through the bearing bracket; a chuck mounted upon the upper end of the shaft; a cutter adjustably mounted upon the chuck; a guide bracket adjustably mounted upon the bearing bracket; and a guide mounted upon the bearing bracket, said guide being slidably and pivotally adjustable relative to the bearing bracket to guide and support material presented to the cutter for shaping.

6. A wood working machine comprising a vertically disposed pillar; a motor mounted adjacent the base of the pillar; a bearing bracket mounted upon the upper portion of the pillar; a vertically disposed shaft connected at its lower end to the rotor of the motor and extending upwardly through the bearing bracket; a chuck mounted upon the upper end of the shaft; a cutter adjustably mounted upon the chuck; a guide bracket mounted upon the bearing bracket and vertically adjustable relative thereto and provided with an offset portion extending upwardly in spaced relation to the cutter; and a guide slidably and pivotally adjustable upon the upwardly extending offset portion of the guide bracket to guide and support material presented to the cutter for shaping.

7. A wood working machine comprising a vertically disposed pillar; a motor mounted adjacent the base of the pillar; a bearing bracket mounted upon the upper portion of the pillar; a vertically disposed shaft connected at its lower end to the rotor of the motor and extending upwardly through the bearing bracket; a chuck mounted upon the upper end of the shaft; a cutter adjustably mounted upon the chuck; a guide bracket mounted upon the bearing bracket and vertically adjustable relative thereto and provided with an offset portion extending upwardly in spaced relation to the cutter; and a guide mounted upon the upwardly extending offset portion of the guide bracket, said guide being slidably and pivotally adjustable within a vertical plane through the axis of the cutter to guide and support material presented thereto for shaping.

8. A wood working machine comprising a vertically disposed pillar; a motor mounted adjacent the base of the pillar; a bearing bracket mounted upon the upper portion of the pillar; a vertically disposed shaft connected at its lower end to the rotor of the motor and extending upwardly through the bearing bracket; a chuck mounted upon the upper end of the shaft; a cutter adjustably mounted upon the chuck; a guide bracket mounted upon the bearing bracket and vertically adjustable relative thereto and provided with an offset portion extending upwardly in spaced relation to the cutter; a guide mounted upon the upwardly extending offset portion of the guide bracket, said guide being slidably and pivotally adjustable within a vertical plane through the axis of the cutter to guide and support material presented thereto for shaping; and guards mounted adjacent the cutter.

9. A wood working machine comprising a vertically disposed pillar; a motor mounted adjacent the base of the pillar; a bearing bracket mounted upon the upper portion of the pillar; a vertically disposed shaft connected at its lower end to the rotor of the motor and extending upwardly through the bearing bracket; a chuck mounted upon the upper end of the shaft; a cutter adjustably mounted upon the chuck; a guide bracket mounted upon the bearing bracket and vertically adjustable relative thereto and provided with an offset portion extending upwardly in spaced relation to the cutter; a guide mounted upon the upwardly extending offset portion of the guide bracket, said guide being slidably and pivotally adjustable within a vertical plane through the axis of the cutter to guide and support material presented thereto for shaping; and guards adjustably mounted upon the upper end of the pillar and movable to operative positions adjacent the cutter to determine the depth of cut to be made.

10. A wood working machine comprising a vertically disposed pillar; a motor mounted adjacent the base of the pillar; a bearing bracket mounted upon the upper portion of the pillar; a vertically disposed shaft connected at its lower end to the rotor of the motor and extending upwardly through the bearing bracket; a chuck mounted upon the upper end of the shaft; a cutter adjustably mounted upon the chuck; a guide bracket mounted upon the bearing bracket and vertically adjustable relative thereto and provided with an offset portion extending upwardly in spaced relation to the cutter; and a guide adjustably mounted upon the upwardly extending offset portion of the guide bracket to guide and support material presented to the cutter for shaping, said guide having a longitudinally disposed slot formed therein to permit sliding longitudinal adjustment and pivotal adjustment within a vertical plane through the axis of the cutter.

11. In a wood working machine, the combination with a power driven cutter mounted upon a vertically disposed shaft and chuck, of a guide adjustably mounted adjacent the cutter, said guide comprising a mounting bracket, a guide member having a longitudinal slot formed therein, and a securing member mounted upon the bracket and extending through the slot of the guide to permit longitudinal sliding adjustment and pivotal adjustment within a vertical plane through the axis of the cutter.

12. In a wood working machine, a base provided with a vertically disposed pillar; a motor secured upon the pillar adjacent the base and transportable therewith, said motor being provided with a vertically disposed upwardly extending shaft; a chuck secured upon the upper end of the motor shaft; and a cutter blade detachably secured upon the chuck.

In witness whereof, I hereunto set my signature.

PIERRE SALVAT.